Feb. 9, 1954
J. H. SCHAEFFER
2,668,605
COMBINATION WEDDING AND ENGAGEMENT
RING AND UNIT THEREFOR
Filed Aug. 14, 1948
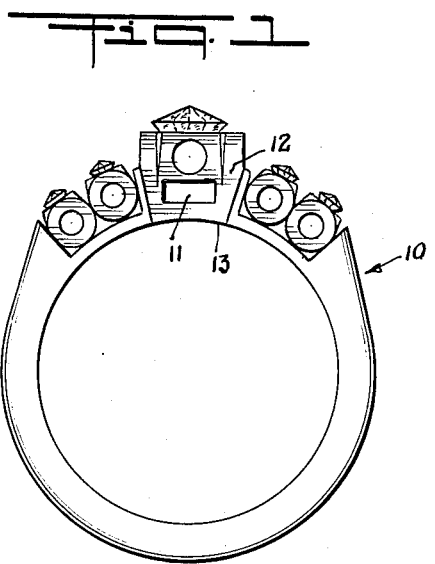
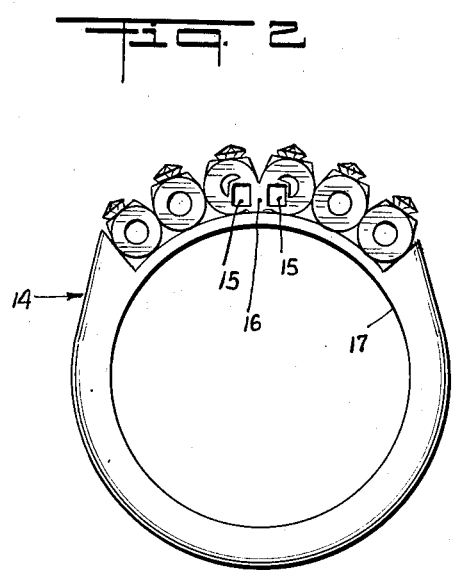
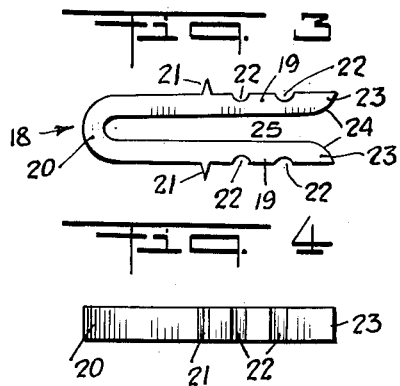
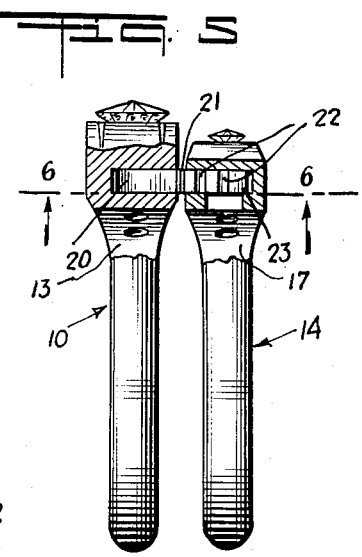
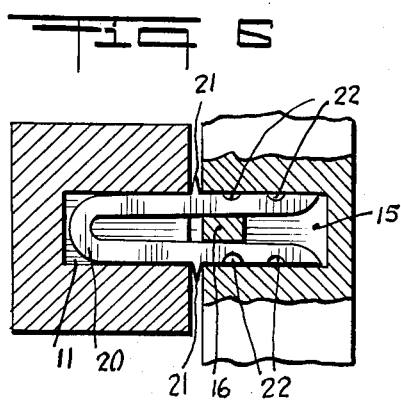
INVENTOR.
Jacob H. Schaeffer
BY
Irving Seidman
ATTORNEY Patented Feb. 9, 1954

2,668,605

UNITED STATES PATENT OFFICE 2,668,605

COMBINATION WEDDING AND ENGAGEMENT RING AND UNIT THEREFOR

Jacob H. Schaeffer, Brooklyn, N. Y.

Application August 14, 1948, Serial No. 44,348

3 Claims. (Cl. 189—36)

This invention relates to improvements in rings and more particularly to the combination of an engagement ring and a wedding ring.

Broadly, it is an object of my invention to provide a unit to interlock two rings of an ensemble to prevent relative axial and rotary movement of said rings.

A further object of my invention is to provide a ring construction which is capable of being readily assembled and disassembled by the use of a small, inexpensive connecting unit formed like the letter U.

A further object is to provide a small inconspicuous slot in an engagement ring, divided by a central upright and a slot in a wedding ring so that when each ring is worn separately the slots will be so inconspicuous that such slots will not be noticeable. The slots may be incorporated as part of the design if desired. When the engagement ring and wedding ring are worn together on a single finger, the small separate interlocking unit is used to interlock both rings to prevent axial rotation to one another to simulate a unitary ring construction keeping the rings at all times in spaced relationship and preventing the rings from rubbing against one another.

Still a further object is to provide a resilient interlocking unit which need not be handled with an instrument, or pliers, but which can be handled with the finger nails to insert and remove the unit.

Another object of the invention is to provide an interlocking unit which will keep the rings together and which will lock the two rings together by a wedge partition.

The rings are so constructed that a jeweler could sell the engagement ring or the wedding ring as individual rings as nothing protrudes on either one. At any time that the owner of such rings desires to interlock the same, such person could purchase or receive the small interlocking unit and in a matter of seconds, without any tool, interlock both rings and prevent axial rotation of the rings to one another. Without such an interlocking unit difficulty is experienced in maintaining the engagement ring and wedding ring in proper position, since they have a tendency to rotate about the finger relative to one another altering the positions of the settings and consequently detracting from the desirable ornamental effect produced when the settings of both rings are properly aligned. The interlocking separable unit prevents such relative rotation when the rings are worn upon the same finger. When the unit is in proper position, interlocking both rings, it is invisible.

For a fuller understanding of the nature and objects of the invention, reference is had to the following detailed description, in connection with the accompanying drawings, in which:

Fig. 1 is a side elevation of an engagement ring showing a small rectangular opening beneath the central stone.

Fig. 2 is a side elevation of a wedding ring showing a central opening divided by a central upright partition adapted to cooperate with a unit inserted in the engagement ring shown in Fig. 1.

Fig. 3 is a top view of the separable interlocking unit.

Fig. 4 is a side view of the unit shown in Fig. 3.

Fig. 5 is a side view of the wedding ring and the engagement ring interlocked by the unit shown in Figs. 3 and 4, the upper portions being shown partly in section.

Fig. 6 is an enlarged sectional view taken through line 6—6 of Fig. 5.

Referring to the drawings, the engagement ring 10, shown in Fig. 1, has a small rectangular opening 11 in the central portion of the setting 12 adjacent to the inner circumference of the engagement ring. The setting 12 is only one form of a design shown for the purposes of illustration and may be designed to hold any desired arrangement of stones or jewels. The wedding ring 14 shown in Fig. 2 also has a rectangular opening 15 divided by a central upright member or partition 16 located at the front of the opening 15. The opening 15 is located in the central portion of the mounting for the jewels and is spaced the same distance from the inner circumference 17 of the wedding ring as the opening 11 shown in Fig. 1.

The rings shown in Figs. 1 and 2 may be of any desired design and the number, size and arrangement of jewels supported by the mounting or setting may be varied in an infinite variety of forms.

In order to prevent relative rotational movement and relative axial movement of the two rings when worn together on the finger, such rings are interlocked by a separate unit 18 in the form of the letter U. This unit has a pair of legs 19—19 which are joined at one end by a semicircular portion 20 and the legs taper outward slightly. The thickness of unit 18 is uniform and at approximately the center of the opposed legs 19 there is a slight projection 21, as best shown in Figs. 3 and 6. The opposed legs 19 also have notches 22 along the outside surfaces so that the finger nails can readily fall into the opposed notches 22 thus permitting the fingers to easily handle the unit 18 without the danger of slipping through the fingers. The width of the unit at the central portion slightly to the left of the projections 21 are slightly wider than the width of the rectangular opening 11. The height or thickness of the unit 18 is slightly less than the height of the opening 11.

When it is desired to interlock the rings shown in Figs. 1 and 2, the unit 18 is grasped between the finger nails of the thumb and another finger so that the finger nails fall into a pair of opposed notches 22 and by slightly compressing the outer ends of opposed legs 19, the rounded end portion 20 can then be readily inserted into the opening 11 until the projections 21 strike the edge or face of the setting 12. Since the unit has resiliency and the width of the unit 18 at the portion adjacent to the projections 21 is slightly wider than the width of opening 11, the unit 18 will be retained within the opening 11 by a slight spring tension. In order to attach the wedding ring to the engagement ring, the design portion or setting of the wedding ring is aligned with the setting 12 of the engagement ring and by moving the two rings together the extremities 23 of the legs 19 will enter the opening 15 at the same time the central member or partition 16 acts as a wedge to force the extremities of legs 19 further apart thus firmly locking the two rings together. The opposed projections 21 act as a spacer between the two rings so that they do not rub against one another. It should be noticed that the inner ends 24 of the legs 19 are slightly rounded to permit the partition 16 to be guided into the space 25 between legs 19.

In order to take the rings apart it is a simple matter to wedge the finger nail between the two rings at the upper setting portions so that the rings can be pried apart leaving the outer ends of the unit 18 projecting from the engagement ring 10. By again compressing the outer ends of the opposed legs 19, the tension of the unit is released and the unit 18 can then be readily withdrawn from the opening 11.

If it is desired to have the rings together, that is touching one another, slight depressions or notches (not shown) may be made on opposite sides of opening 11 to receive the projections 21. Since the rings cannot rotate axially relative to one another, there will be no rubbing against one another.

It is understood that various changes and modifications may be made in the design of the rings and in the size and position of the openings to receive the interlocking unit or member without departing from the general spirit of the invention. It is also to be understood that the openings may be reversed, that is, the opening with the partition of the wedding ring may be in the engagement ring and vice versa.

I claim:

1. The combination of a member having an opening extending inwardly from one side face thereof, a central upright element arranged centrally in said opening adjacent the open front side thereof, a second member having an opening extending inwardly from one side face thereof and disposed in registry with the opening in the first mentioned member, a U-shaped locking unit formed of spring metal and having its legs tapering gradually outwardly toward their free ends, the closed end portion of said U-shaped locking unit fitting snugly yet removably in the opening in the second mentioned member, said upright element coacting with the inner opposed sides of the legs of the U-shaped locking unit to force the outer side faces of the legs into engagement with the respective sides of the opening in the first mentioned member to lock the two members together against rotation with respect to each other when the free ends of the legs of the U-shaped locking unit are disposed within the opening in the first mentioned member.

2. The combination of a member having an opening extending inwardly from one side face thereof, a central upright element arranged centrally in said opening adjacent the open front side thereof, a second member having an opening extending inwardly from one side face thereof and disposed in registry with the opening in the first mentioned member, a U-shaped locking unit formed of spring metal and having its legs tapering gradually outwardly toward their free ends, the closed end portion of said U-shaped locking unit fitting snugly yet removably in the opening in the second mentioned member, said upright element coacting with the inner opposed sides of the legs of the U-shaped locking unit to force the outer side faces of the legs into engagement with the respective sides of the opening in the first mentioned member to lock the two members together against rotation with respect to each other when the free ends of the legs of the U-shaped locking unit are disposed within the opening in the first mentioned member, and side projections extending outwardly from the intermediate portions of the legs of the U-shaped locking unit to hold the members in slightly spaced interlocked relation.

3. The combination of a member having an opening extending inwardly from one side face thereof, a central upright element arranged centrally in said opening adjacent the open front side thereof, a second member having an opening extending inwardly from one side face thereof and disposed in registry with the opening in the first mentioned member, a U-shaped locking unit formed of spring metal and having its legs tapering gradually outwardly toward their free ends, the closed end portion of said U-shaped locking unit fitting snugly yet removably in the opening in the second mentioned member, said upright element coacting with the inner opposed sides of the legs of the U-shaped locking unit to force the outer side faces of the legs into engagement with the respective sides of the opening in the first mentioned member to lock the two members together against rotation with respect to each other when the free ends of the legs of the U-shaped locking unit are disposed within the opening in the first mentioned member and side projections extending outwardly from the intermediate portions of the legs of the U-shaped locking unit to hold the members in slightly spaced interlocked relation, the legs of the U-shaped locking unit being formed with fingernail engaging notches in their outer side faces adjacent the free ends thereof.

JACOB H. SCHAEFFER.

References Cited in the file of this patent

UNITED STATES PATENTS

| Number | Name | Date |
|---|---|---|
| 589,921 | Ashworth | Sept. 14, 1897 |
| 1,051,427 | McCluskey | Jan. 28, 1913 |
| 1,194,509 | Kosovsky | Aug. 15, 1916 |
| 1,224,965 | Schwartzman | May 8, 1917 |
| 1,296,342 | Tozzi | Mar. 4, 1919 |
| 1,724,130 | Dayton et al. | Aug. 13, 1929 |
| 1,982,864 | Granat | Dec. 4, 1934 |
| 2,225,379 | Pulver | Dec. 17, 1940 |
| 2,329,471 | King | Sept. 14, 1943 |
| 2,571,674 | Braunstein | Oct. 16, 1951 |